Patented Mar. 19, 1935

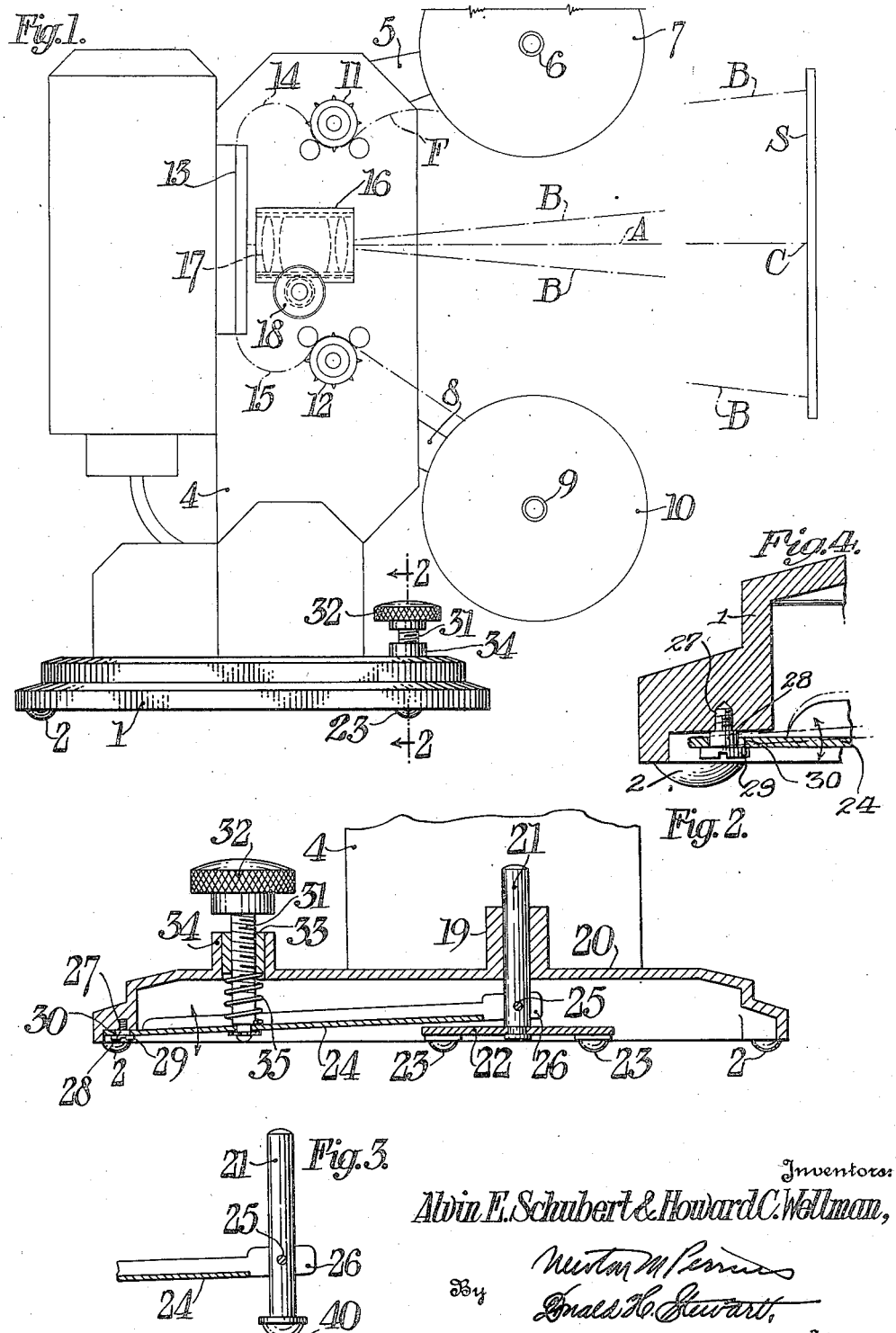

1,994,601

UNITED STATES PATENT OFFICE 1,994,601

ELEVATING DEVICE FOR PROJECTORS

Howard C. Wellman and Alvin E. Schubert, Rochester, N. Y., assignors to Eastman Kodak Company, Rochester, N. Y., a corporation of New York Application June 15, 1932, Serial No. 617,392

14 Claims. (Cl. 248—15)

This invention relates to photography and more particularly to an elevating device for motion picture apparatus, such as motion picture projectors. One object of our invention is to provide an elevating device which properly supports the weight of the projector and which can be operated with very little effort. Another object of our invention is to provide an elevating device which is guided on the base of a projector and which may be operated by an operating member located in a convenient position on the base. Another object of our invention is to provide an operating screw for moving the elevating device, the operating screw being connected to the elevating device by means of a lever system by which the mechanical advantage of the screw is materially increased. Another object of our invention is to provide an elevating device with a counter-balancing spring arranged in such a manner that very little effort is required to actuate the device. Still another object of our invention is to provide an elevating device having a sliding engagement with the base and being operated by a manual means spaced some distance from the slidable support and other objects will appear from the following specification, the novel features being particularly pointed out in the claims at the end thereof.

Coming now to the drawing wherein like reference characters denote like parts throughout:

Fig. 1 is a side elevation of a motion picture projector having the base equipped with an elevating device constructed in accordance with and illustrating a preferred embodiment of our invention.

Fig. 2 is an enlarged cross-section on line 2—2 of Fig. 1.

Fig. 3 is an enlarged fragmentary detail view of an elevating foot constructed in accordance with another embodiment of our invention.

Fig. 4 is an enlarged fragmentary detail view of the pivoted support for an adjustable lever constituting a part of the structure.

While it is obvious that our invention is suitable for use on any piece of apparatus in which a base is employed and in which it is desirable to change the inclination of the base, our elevating device is particularly designed for use on motion picture projectors.

Accordingly, in Fig. 1 we have illustrated a typical form of motion picture projector which may consist of a base 1 which may be supported by rear feet 2 and front feet 23 which are rigidly or fixedly attached to the base.

The base 1 and the housing and other structural elements rigidly carried by it constitute a main frame to which the various mechanisms of the projector and of the elevating device are attached.

This base supports an upright housing 4 to which there is an arm 5 attached toward the top of the housing, this arm supporting a shaft 6 adapted to receive a supply reel 7 of film F. There is a lower arm 8 similar to arm 5 in that it carries a shaft 9 adapted to support a take-up reel 10. As is customary, the shaft 9 is driven by power to wind the film F thereon after it passes over the sprockets 11 and 12 between which the gate 13 is located. The sprockets 11 and 12 move the film to and from loops 14 and 15 and some form of intermittent pulldown is employed in the gate 13 for intermittently moving the film past an exposure aperture as is customary with machines of this type.

There is also a support 16 carried by the housing 4 in which an objective 17 is movably mounted. This objective may be focused by means of the knurled wheel 18 so that the objective forms an image of a picture on the film on a motion picture screen S along the axis A of the objective. As thus far described, the machine may be of any well-known construction.

Coming now to our invention, the base 1 of the machine as above described is provided with a pair of rear feet 2. These feet may be conveniently made of rubber, leather, or any other material which will not abrade or damage furniture on which the projector may rest. The feet 2 are fixed relative to the base.

The base is inclined by the relative movement of the base and a post 21, the two having a sliding relation. In use the feet 23 on the foot of the post 21 will remain still and the base will be raised. In the following description, however, the device will be described as a mechanism, a small part of which including the post 21 is movable with respect to the rest.

In order to alter the inclination of the base so as to alter the axis A of the objective and consequently to alter the location of the light beam, diagrammatically shown by the dotted lines B, we provide a bearing or slideway 19 in the top 20 of the base 1, this slideway being adapted to receive a slidable member such as the post 21. This post, as shown in Fig. 2, may be provided with a cross arm 22 with a pair of feet 23 in spaced relation. Feet 23 are movable together relative to the base 1.

The post 21 may be moved in its slideway by means of a lever arm 24 pivotally attached by means of the pivot 25 passing through the post 21 and passing through ears 26 on the lever. This lever is hingedly connected to the base 1 by means of a screw 27, this screw having a shoulder 28 and a head 29 secured to the base through an aperture 30 in the lever arm 24 in such a manner that the lever arm is free to swing in the direction shown by the arrow upon its support. It necessarily follows that the screw head 29 cannot clamp the lever arm 24 but is spaced by the shoulder 28 sufficiently to permit swinging of the arm. Fig. 4 shows in detail this relationship. In order to move the arm about the shoulder 28, there is a screw 31 having a knurled operating head 32. Screw 31 passes through a threaded sleeve 33 pressed in the bearing 34 formed on the base 1. As the screw 31 is moved, the lever arm 24 is moved and consequently the post 21 and the movable feet 23 are accordingly adjusted.

The mechanical advantage of the screw is such that the post 21 can be readily moved. The screw is much closer to the pivotal support, that is shoulder 28, than it is to the post so that it need not be turned many times to materially alter the elevation of base 1.

We prefer to place a compression spring 35 about the lower end of screw 31 between the sleeve 33 and the arm 24, this spring being of such strength that the weight of the projector as a whole is counter-balanced so that very little effort is required to turn the screw 31 in either direction. It also takes up any play or lost motion between the base and the arm.

With an elevating device of this type, the knurled operating member 32 can conveniently be arranged to one side of the housing 4 which encloses the operating mechanism of the projector and at the same time the movable feet 23 may be properly placed on the base to support the weight of the projector.

It is sometimes useful to provide a projector with three feet as such a projector can readily stand upon an uneven surface. Accordingly, a base similar to that above described may be used with two fixed feet and a single movable foot 40. This foot may be carried by post 21 which may be operated by lever arm 24, as described, for the preferred embodiment of our invention. The single foot is illustrated in Fig. 3. If a single foot is used, it is, of course, preferable to place this foot so as to support the weight of the projector properly, even though this may require placing the foot unsymmetrically on the base. However, if the weight of the projector is evenly distributed on the base 1, the post 21 should be in the center of the base.

In either case, the location of the post 21 is not material so far as the operation of the post goes, because the operating knurled head 32 is spaced some distance from the post in a position in which it is readily accessible to an operator.

It frequently happens in setting up a motion picture projector, and especially a motion picture projector for home use, that the support is not at the most desirable elevation and that a picture projected along an axis A may not strike the center C of a screen S. Consequently, the cone of light indicated by the lines B will not lie entirely on the screen.

With a machine constructed in accordance with our invention, the knurled head 32 which is placed over near the edge of the base 1 is readily accessible and may be turned to alter the inclination of the base until the picture is properly located upon a screen S.

While we have illustrated and described a preferred embodiment of our invention, it is obvious that various different forms of the invention may be worked out in adapting the invention to various different type machines. We accordingly claim as within the scope of our invention all such forms as may come within the scope of the appended claims.

We claim:

1. In motion picture apparatus, a rigid main frame having feet fixedly secured thereto at one end, a member having a vertically movable relation to the main frame, a foot on the bottom of said member, means for adjusting the position of said member with respect to the frame and for holding it in adjusted position, and means for taking up lost motion between the frame and adjusting means, whereby, when the apparatus is positioned with the said feet upon a supporting surface, the inclination of the frame to such surface may be adjusted.

2. In a motion picture apparatus, a rigid main frame, feet fixedly secured to one end thereof, a movable member having other feet on the bottom thereof and a mechanism for adjusting the relative position of the frame and the movable member and including a pin having a screw-threaded engagement with the frame.

3. In a motion picture apparatus, a rigid main frame, feet fixedly secured to one end thereof, a movable member having a foot on the bottom thereof and a mechanism for adjusting the relative position of the frame and the movable member and including a pin having a screw-threaded engagement with the base, and a compression spring between the base and a movable part of the mechanism.

4. A motion picture apparatus comprising a rigid main frame, feet fixed on said frame, a mechanism relatively movable with respect to the frame and carrying feet and hingedly attached to the frame, a screw engaging said frame and a part of said mechanism for adjusting their relative positions, and a compression spring encircling the screw between the base and the mechanism and tending to take up lost motion and to support the apparatus.

5. In a motion picture apparatus the combination with a base, of feet fixedly mounted on the base, a post slidably mounted on the base, feet carried by the post and means for moving the post including an arm movably attached to the base and post and means spaced from the post for moving the arm.

6. In a motion picture apparatus the combination with a base, of feet fixedly mounted on the base, a post slidably mounted on the base, feet carried by the post, and means for moving the post including an arm movably attached to the base and post and means, including a screw carried by the base and engaging the arm, for moving the arm and post.

7. In motion picture apparatus, a rigid main frame having feet rigidly secured thereto at one end, a post having a vertical sliding relation to the main frame, a foot on the bottom of said post, means for adjusting the relative position of the post and frame comprising a lever pivotally connected to the frame and also to the post and a manually adjustable device connected to the frame and lever for adjusting them with respect to each other and for holding them in adjusted position.

8. A motion picture apparatus comprising a main frame, feet fixedly mounted on the frame, a post having a sliding engagement with the frame and having feet positioned laterally on opposite sides of the center of gravity of the apparatus, and means for adjusting the relative position of the post and frame and including a lever arm connected to the post and to the frame, and an adjusting mechanism positioned farther from the center of gravity than the said feet on the post and engaging the lever arm and the frame, whereby, when the apparatus is positioned with the said feet upon a supporting surface, the inclination of the frame to such surface may be adjusted.

9. In motion picture apparatus the combination with a base having two bosses thereon, of a post slidably mounted in one boss, a screw threaded into the other boss, a foot carried by said post, and a lever arm pivotally attached to the base and post and having an operative connection with said screw whereby the relative position of said foot and base may be adjusted through said lever by said screw.

10. In motion picture apparatus the combination of a base having two bosses thereon, a post slidably mounted in one boss, a foot carried by said post, and a lever arm pivotally attached to the base and post, a screw threaded into the other boss and revolubly attached to said arm whereby the screw may be turned to adjust the relative position of said base and said foot through said arm and post.

11. In motion picture apparatus the combination of a base having two bosses thereon, a post slidably mounted in one boss, a foot carried by said post, and a lever arm pivotally attached to the base and post, a screw threaded into the other boss and revolubly attached to the said arm and a compression spring between the lever and base and tending to support the weight of said motion picture apparatus, whereby the screw may be turned to adjust the relative position of said base and said feet through said arm and post.

12. Motion picture apparatus comprising a base, a downwardly extending peripheral flange carried by the base, feet rigidly carried by the base, an adjustable mechanism with feet movable relative to the base, whereby the inclination of the base to a supporting surface may be adjusted, and means carried by the base for adjusting the mechanism, said mechanism and feet being concealed behind the downwardly extending flange of the base.

13. In a motion picture apparatus the combination with a base, a downwardly extending peripheral flange carried thereby, feet fixedly mounted with respect to the base, and a mechanism with feet movably mounted with respect to the base within said downwardly extending flange, and means for adjusting the position of the base with respect to the mechanism and feet comprising a screw passing through said base and operatively connected to said mechanism.

14. In a motion picture apparatus the combination with a base, a downwardly extending peripheral flange carried thereby, two pairs of feet for supporting the base, at least one pair of said feet being movably mounted with respect to said base, the movably mounted feet being on a mechanism pivotally mounted to said base within said downwardly extending flange, and means for operating said mechanism extending up through the base, said means including an operating handle on the exterior of said base.

HOWARD C. WELLMAN.
ALVIN E. SCHUBERT.